(12) United States Patent
Reese (10) Patent No.: US 9,715,599 B2
(45) Date of Patent: Jul. 25, 2017

(54) CONTEXT AWARE INTEGRATED DISPLAY KEYBOARD VIDEO MOUSE CONTROLLER

(71) Applicant: Forcepoint Federal LLC, Herndon, VA (US)

(72) Inventor: Dale W. Reese, San Antonio, TX (US)

(73) Assignee: Forcepoint Federal LLC, Herndon, VA (US)

( * ) Notice: Subject to any disclaimer, the term of this patent is extended or adjusted under 35 U.S.C. 154(b) by 141 days.

(21) Appl. No.: 14/609,633

(22) Filed: Jan. 30, 2015

(65) Prior Publication Data
US 2015/0213275 A1    Jul. 30, 2015

Related U.S. Application Data

(60) Provisional application No. 61/933,524, filed on Jan. 30, 2014.

(51) Int. Cl.
*G06F 21/83*    (2013.01)
*G09G 5/00*     (2006.01)
*G06F 21/84*    (2013.01)

(52) U.S. Cl.
CPC ............ *G06F 21/83* (2013.01); *G06F 21/84* (2013.01); *G09G 5/006* (2013.01); *G09G 2370/24* (2013.01)

(58) Field of Classification Search
CPC .... G09G 5/006; G09G 2370/24; G06F 21/83; G06F 21/84
See application file for complete search history.

(56) References Cited

U.S. PATENT DOCUMENTS

| | | | | |
|---|---|---|---|---|
| 2009/0055934 A1* | 2/2009 | Jauer | ............ | G06F 21/52 726/26 |
| 2011/0050712 A1* | 3/2011 | Jackson | ............ | G06F 9/45558 345/503 |
| 2011/0264922 A1* | 10/2011 | Beaumont | ............ | G06F 21/84 713/189 |
| 2013/0091589 A1* | 4/2013 | Shiakallis | ............ | G06F 21/86 726/34 |
| 2014/0208442 A1* | 7/2014 | Mooring | ............ | G06F 9/45533 726/30 |
| 2014/0282050 A1* | 9/2014 | Quinn | ............ | G06F 9/4445 715/744 |

OTHER PUBLICATIONS

"Secure KVM Combiners", [online]. (c) 2015 High Sec Labs Ltd. [archived on Jan. 26, 2015]. https://web.archive.org/web/20150126170651/http://www.highseclabs.com/data/HSL_QSG_K404F_K424F_K404D_KVM_Combiner_20140224.pdf>, 2 pgs.

\* cited by examiner

*Primary Examiner* — Robert Leung
(74) *Attorney, Agent, or Firm* — Schwegman Lundberg & Woessner, P.A.

(57) ABSTRACT

A system and method is provided to permit a first computer to interact with computers in different security domains without forming covert channels. Separate GPUs are provided for each computer. An image routing map (IRM) determines which security domain is the subject of an I/O event to determine to which security domain to send the I/O event. A response is transmitted to the associated GPU and multiplexor and another response used to update the IRM, which is then provided to the MUX. The MUX uses the updated IRM to adjust the content on the monitor. Content from the security domains are able to be displayed on the monitor and in a similar manner as by the computer in each security domain.

19 Claims, 5 Drawing Sheets

CONTEXT AWARE INTEGRATED DISPLAY KEYBOARD VIDEO MOUSE CONTROLLER

PRIORITY CLAIM

This application claims priority under 35 U.S.C. 119(e) to U.S. Provisional Patent Application Ser. No. 61/933,524, filed Jan. 30, 2014 which is incorporated herein by reference in its entirety.

GOVERNMENT RIGHTS

This invention was made with Government support under Contract Number FA8307-12-C-1010 awarded by United States Air Force. The Government has certain rights in this invention.

TECHNICAL FIELD

Embodiments pertain to video processing resources. Some embodiments relate to robust, mutually exclusive video processing resources for different security domains.

BACKGROUND

Network and computer security is an ever-increasing worry for many companies and individual users. In particular, there are a number of environments in which computers in multiple security domains exist, such as Unclassified, Confidential, Secret, etc. . . . Security domains are isolated environments within a computer system (called a Multiple Independent Levels of Security (MILS) system) that are often connected to a sensitive network. This sensitive network is itself physically separated from other, open networks that the sensitive network may desire to interact with from time to time. In some circumstances, it is desirable to share video resources and user I/O inputs among the disparate security domains. Unfortunately, computers in these environments currently share a single graphics processing unit (GPU) between the security domains, leading to an inadvertent avenue for malicious interaction (as referred to as covert channels) across the supposedly isolated security domains through the GPU. In particular, as the GPU is shared between the various security domains, data residing on the GPU and data in the memory spaces of the separate security domains are vulnerable to attacks launched from the GPU. Moreover, due to the nature of the resource sharing, extensive testing of components used in such systems increase production costs and lengthen time-to-production dramatically.

There is thus a need for systems and methods that increase the security between different security domains, in particular when video and I/O resources are shared. Moreover, there is a need for such systems and methods to display content from the disparate security domains in a manner that emulates display at the individual computers providing the content.

BRIEF DESCRIPTION OF THE DRAWINGS

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, in environments such as military networks in which video resources are shared and user input permitted to interact with computers in different security domains, a separate GPU (and associated memory) is provided for each security domain to prevent malicious interaction between security domains instead of attempting to share a single video resource between a plurality of security domains. The system is able to determine the focus (the active window) and respond accordingly. Moreover, display of the content from the security domains at the user computer is provided in a manner that allows the user of the computer to view the content in a flexible manner. Thus, unlike existing Multiple Independent Levels of Security (MILS) systems, which require full screen switching via Keyboard Video Mouse (KVM) switches or remote desktop protocols to access the different security domains, individual application windows from each security domain in the instant system are able to be displayed on a single monitor and in a desired manner.

In one embodiment, the system processes information from computers multiple isolated networks on a common platform while maintaining security and isolation between the networks. In other embodiments, different security domains may reside on a single network. The system is able to host a plurality of independent operating systems on a single hardware platform. In one embodiment, the security and isolation is provided by a separation kernel in the system. In one embodiment, a separation kernel isolates access between the individual GPUs used to provide the video resources to a single computer so that data residing on the GPU and data in the memory of the separate security domains are less vulnerable to the establishment and use of covert channels between the security domains. Moreover, since each GPU (and driver) only processes data associated with a single security domain, testing for security purposes is able to be less rigorous as the components are no longer within a logically secure location.

Figure 1:
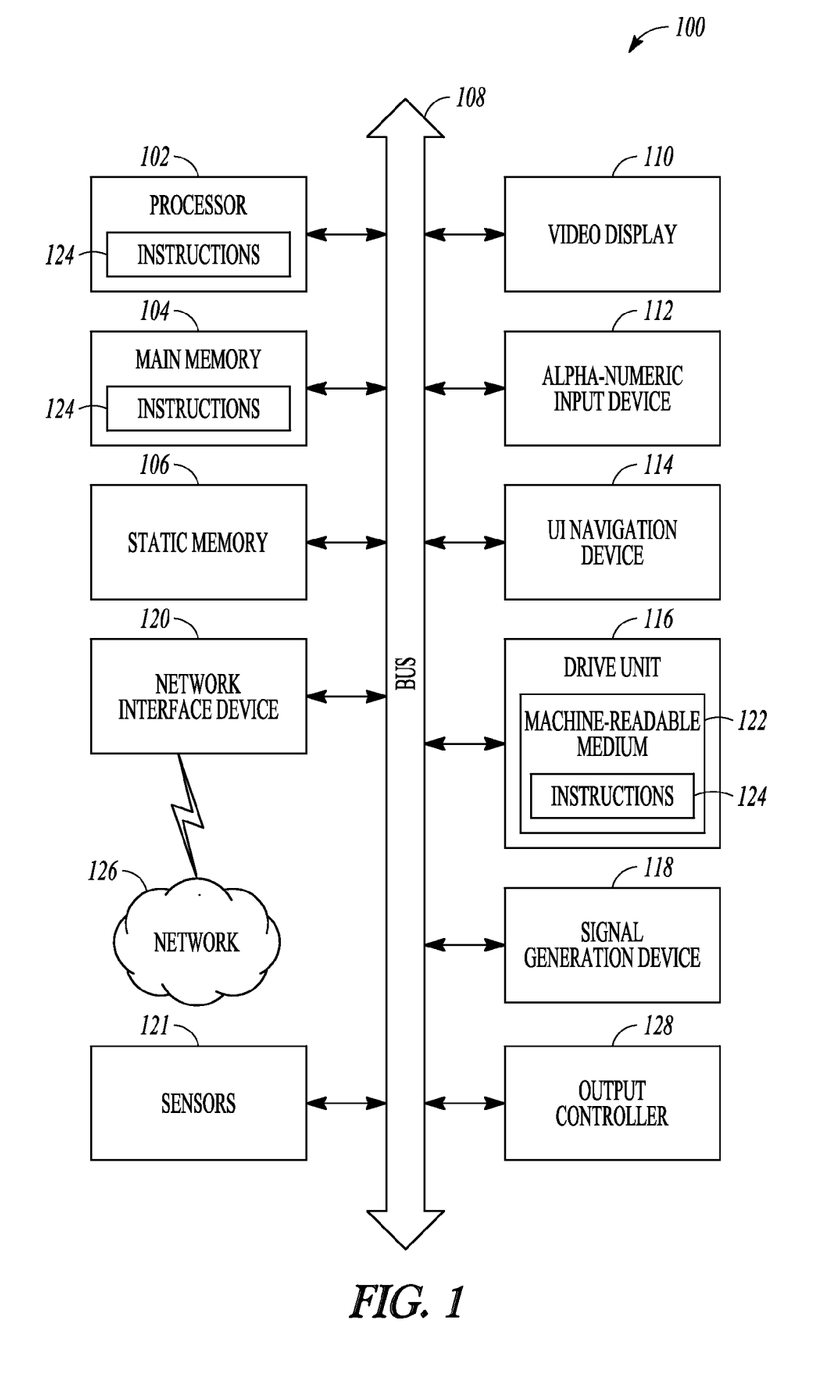
FIG. 1 is a block diagram of a machine in accordance with some embodiments.

FIG. 1 illustrates a block diagram of a machine in accordance with some embodiments. In some embodiments the machine may be a computer configured to perform any one or more of the techniques (e.g., methodologies) discussed herein. In alternative embodiments, the computer 100 may operate as a standalone device or may be connected (e.g., networked) to other computers. In a networked deployment, the computer 100 may operate in the capacity of a server, a client, or both in server-client network environments. In an example, the computer 100 may act as a peer machine in peer-to-peer (P2P) (or other distributed) network environment. The computer 100 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single computer is illustrated, the term "computer" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Computer (e.g., computer system) 100 may include a hardware processor 102 (e.g., a central processing unit (CPU), a GPU, a hardware processor core, or any combination thereof), a main memory 104 and a static memory 106, some or all of which may communicate with each other via an interlink (e.g., bus) 108. The computer 100 may further include a display unit 110, an alphanumeric input device 112 (e.g., a keyboard), and a user interface (UI) navigation device 114 (e.g., a mouse). In an example, the display unit 110, input device 112 and UI navigation device 114 may be a touch screen display. The computer 100 may additionally include a storage device (e.g., drive unit) 116, a signal generation device 118 (e.g., a speaker), a network interface device 120, and one or more sensors 121, such as a global positioning system (GPS) sensor, compass, accelerometer, or other sensor. The computer 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 116 may include a machine readable medium 122 on which is stored one or more sets of data structures or instructions 124 (e.g., software) embodying or utilized by any one or more of the techniques or functions described herein. The instructions 124 may also reside, completely or at least partially, within the main memory 104, within static memory 106, or within the hardware processor 102 during execution thereof by the computer 100. In an example, one or any combination of the hardware processor 102, the main memory 104, the static memory 106, or the storage device 116 may constitute machine readable media.

While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the computer 100 and that cause the computer 100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 124 may further be transmitted or received over a communications network 126 using a transmission medium via the network interface device 120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 120 may include one or more physical jacks (e.g., Ethernet, coaxial, or phone jacks) or one or more antennas to connect to the communications network 126. In an example, the network interface device 120 may include a plurality of antennas to wirelessly communicate using at least one of single-input multiple-output (SIMO), multiple-input multiple-output (MIMO), or multiple-input single-output (MISO) techniques. In some examples, the network interface device 120 may wirelessly communicate using Multiple User MIMO techniques. The term "transmission medium" shall be taken to include any intangible medium that is capable of storing, encoding or carrying instructions for execution by the computer 100, and includes digital or analog communications signals or other intangible medium to facilitate communication of such software.

Figure 2:
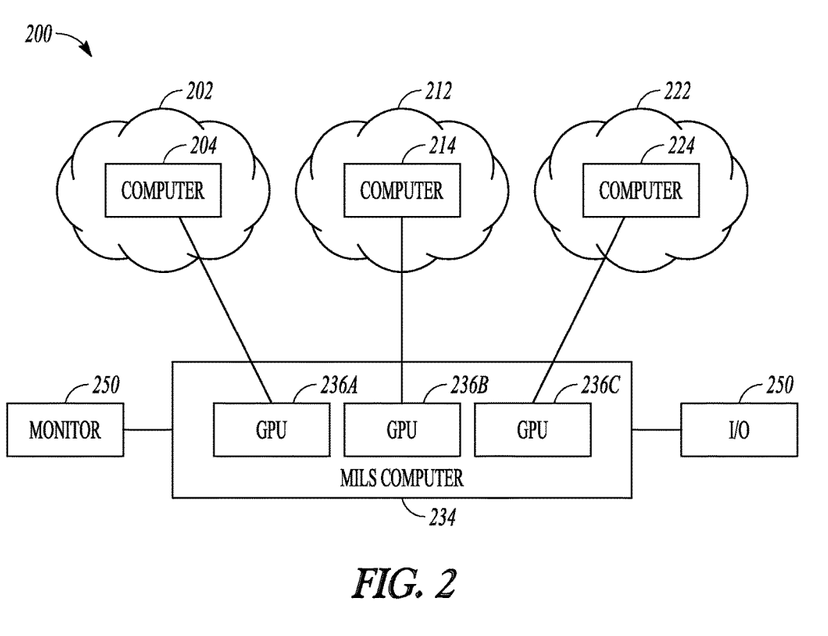
FIG. 2 illustrates a general view of a system in accordance with some embodiments.

FIG. 2 illustrates a general view of a system in accordance with some embodiments. In some embodiments, the system 200 has multiple different secure environments 202, 212, 222. A different computer 204, 214, 224 resides within each secure environment 202, 212, 222. The computers 204, 214, 224 may operate on independent operating systems. Examples of the operating systems may include Unix, Windows, DOS, and Mac systems. In different embodiments the computers may be virtual computers emulated in one or more machines (such as MILS computer 234 or any one of computers 204, 214, 224) and/or one or more of the computers 204, 214, 224 may be physical machines disposed proximate (e.g., in the same room or building) or dispersed across different networks and different physical locations. Although only three domains and computers are shown in the figures, any number of domains and computers within those domains may be used. A MILS computer 234 contains a single GPU 236a, 236b, 236c for each computer 204, 214, 224 such that the selected GPU 236a, 236b, 236c is able interact with the appropriate computer 204, 214, 224 in the secure environments 202, 212, 222. The MILS computer 234 may be connected with a monitor 240 and user I/O devices (e.g., keyboard and mouse) 250 such that the monitor 240 is able to simultaneously display content from the computers 204, 214, 224 and the user I/O devices (e.g., keyboard and mouse) 250 interact appropriately with the computers 204, 214, 224.

Figure 3:
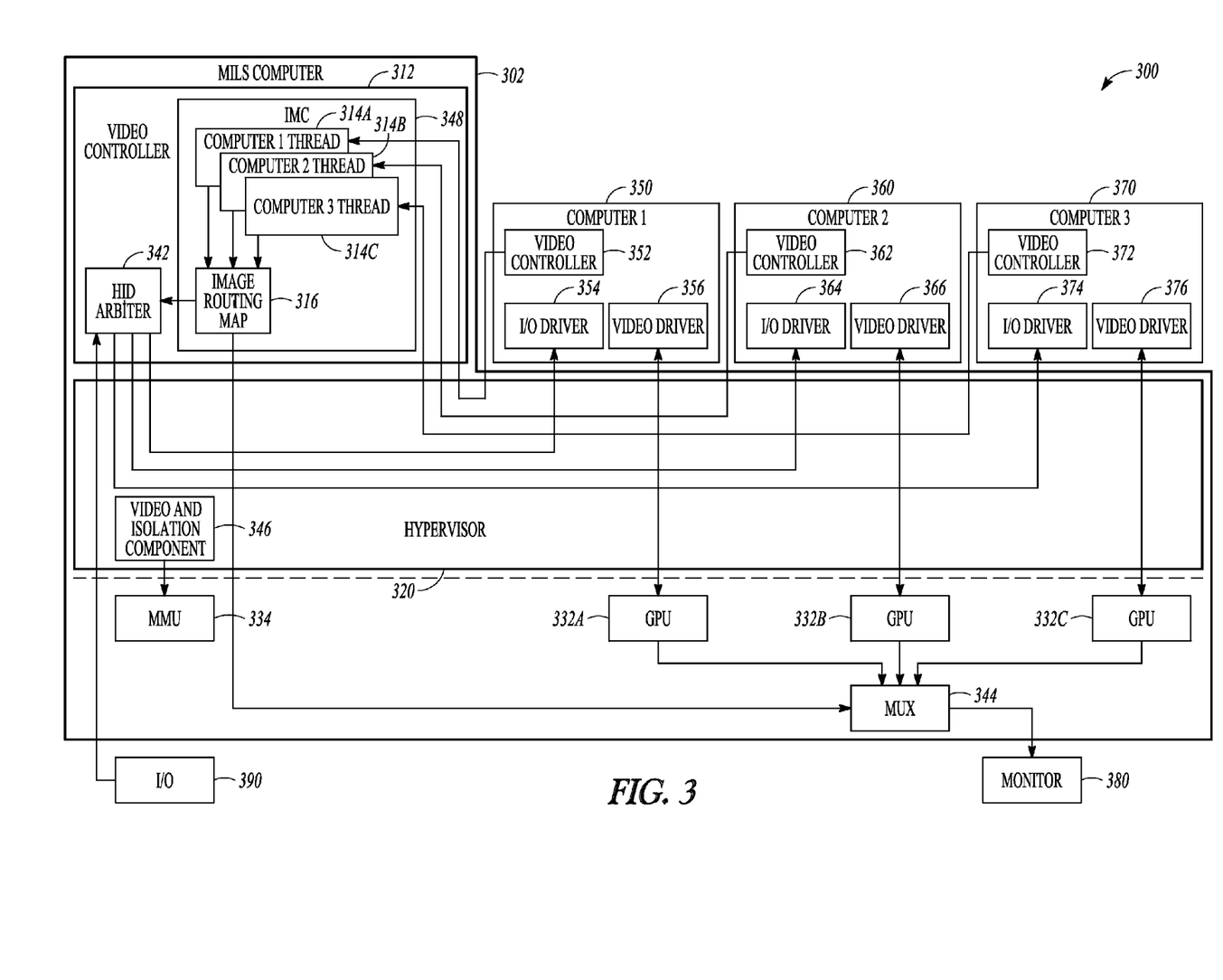
FIG. 3 illustrates a more detailed view of a system in accordance with some embodiments.

A more detailed view of a system in accordance with some embodiments is shown in FIG. 3. As shown the system 300 contains a MILS computer 302 in communication with other computers 350, 360, 370 which are each in different security domains (not shown in FIG. 3). In other embodiments, more than one computer may reside in a security domain. The MILS computer 302 contains a hyperviser 320, a video controller 312, GPUs 332a, 332b, 332c, a human interface device (HID) arbitration component 342, a video multiplexing component 334, a video isolation component 346, an interaction and management component 348, and a memory management unit (MMU) 334. A monitor 380 and user I/O devices (e.g., keyboard and mouse) 390 are connected with the computer 302.

The computer 302 is a host machine that uses a hypervisor 320 stored in memory. The hypervisor 320 is also called a separation kernel and virtualizes resources of the computer 302 to provide shared access to each computer 350, 360, 370 while at the same time preventing covert channels from being formed (i.e., information from passing covertly) between the security domains associated with the computer 350, 360, 370. The hypervisor 320 resources are controlled by a video controller 312. Each computer 350, 360, 370 has its own video controller 352, 362, 372, I/O driver 354, 364, 374 and video driver 356, 366, 376.

The MILS computer 302 provides an independent GPU 332a, 332b, 332c for each computer 350, 360, 370. The MILS computer 302 determines which content should be shown on the monitor 380 and subsequently parses output video streams of the GPUs 332a, 332b, 332c (which in one embodiment are each provided in Digital Visual Interface (DVI) format) and multiplexes the output streams from the disparate security domains together to be displayed on the monitor 380 using a video multiplexer (MUX) 344. The video isolation component 346 establishes one-to-one mappings between each security domain associated with the computer 350, 360, 370 and its associated physical GPU 332a, 332b, 332c as well as enforcing isolation between the individual mappings. This prevents the security domain associated with one mapping from accessing the GPU resources of another security domain. The video multiplexing component 344 subsequently integrates the video streams into a unified display for presentation on the monitor 380.

Figure 4:
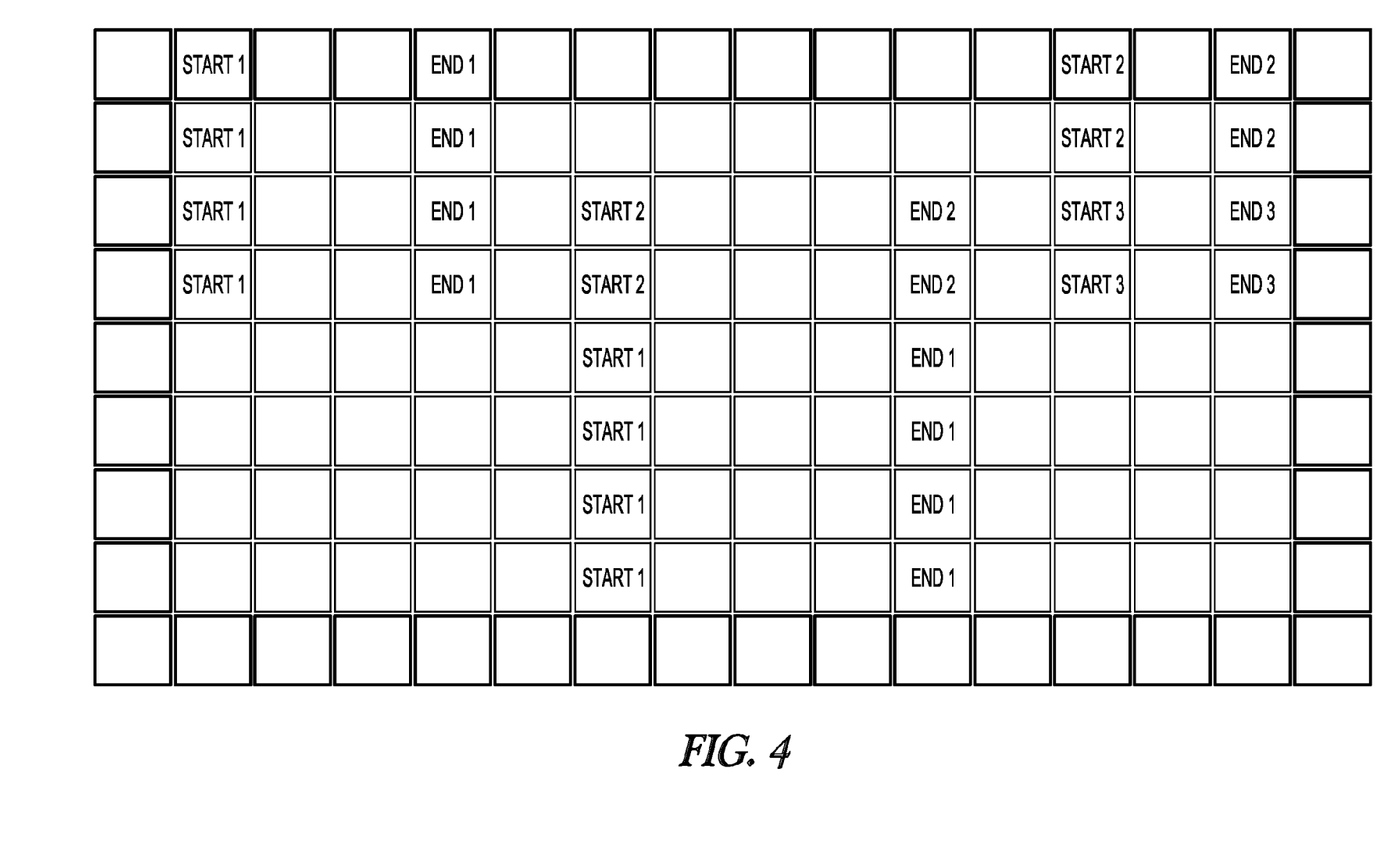
FIG. 4 illustrates an image routing map in accordance with some embodiments.

The interaction and management component 348 performs several tasks. One of these tasks is that the interaction and management component 348 identifies and arbitrates content to be displayed on the monitor 380. The interaction and management component 348 also tracks applications and security domains associated with the content allowing real-time monitoring of which applications are active and being utilized by the user of the MILS computer 302, as well as with which security domain and content the user is interacting. The interaction and management component 348 also collects pixel address information from the active applications and generates an image routing map 316 to map what content being displayed on the monitor 380, where the content is being displayed and from which security domain the content originates. One such mapping is shown in FIG. 4. The interaction and management component 348 also maintains a list of application windows that are open in the MILS computer 302. The interaction and management component 348 is able to operate in one or more modes including single mode and mixed mode, as described in more detail below.

An image routing map (IRM) in accordance with some embodiments is shown in FIG. 4. As an initial point, the GPUs 332a, 332b, 332c in the FPGA output digital video using the Digital Visual Interface (DVI) format. DVI is a digital high-speed serial protocol whose standard relies on transition minimized differential signaling. Each DVI cable thus contains differential pairs (e.g., four), a forward clock signal, and an I²C channel. Individual pixels are encoded as a 24 bit Red, Green, Blue (RGB) packet and are streamed over the DVI interface. Each color is represented by its own byte and transmitted over one of the differential transmit pairs. The fourth pair is used for control data, such as vertical and horizontal sync, in additional to serial link training control tokens. The I²C channel provides access to the receiving devices Extended Display Identification Data (EDID). EDID provides the transmitting device with the capabilities of the receiving device, such as the supported resolution, color depth, and refresh rates. The DVI standards are electrically and logically cross-compatible with both HDMI and Display Port standards, of which in one embodiment HDMI signals and connectors are used to display content on the monitor 380. Each HDMI connector is connected to a different buffer that cleans up noise of the corresponding HDMI signal, and routed to the video MUX 344. As each data line is serial encoded with 8b10 encoding, logical decoding of the HDMI signal is then performed. A forwarding clock executing at $1/n^{th}$ the data rate is used to latch in incoming packets, so the clock signal is recaptured and multiplied by n using a Phase Locked Loop (PLL). Each HDMI signal is then phase-aligned to the clock to insure that the individual data bits are latched in while within the center of the signal and not within the jitter regions.

The HDMI signals are rastered onto the monitor 380 screen pixel by pixel in a streaming flow to form an HDMI stream. An IRM filter filters pixels from each security domain to be displayed on the monitor 380. The IRM filter passes desired pixels to a Video Direct Memory Access (VDMA) component, which writes the pixels into to a memory resident frame buffer associated with port receiving the pixels to display on the monitor 380. More specifically, each pixel has an associated address that represents X and Y coordinates of the pixel within the display of the monitor 380. As each pixel is processed, the associated address is compared against the contents of the IRM 316 data structure. The result of this comparison indicates to the IRM filter to forward or erase the particular pixel. Each IRM filter receives its own IRM data structure, which identifies regions of the video stream intended for display on the monitor 380.

Figure 5:
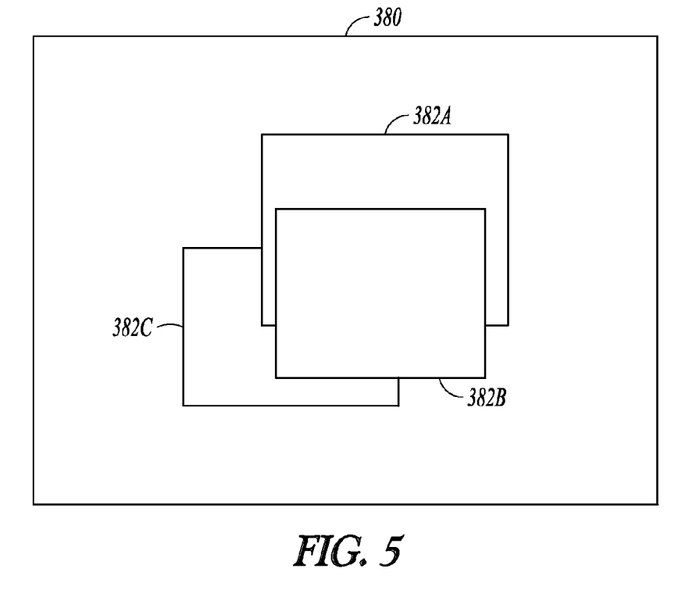
FIG. 5 illustrates a typical display in accordance with some embodiments.

As shown in FIG. 4, the computer renders three windows on monitor 380. The IRM data structure contains vertical rows that correspond to the vertical lines of pixels on the monitor 380. Each line contains line descriptors (hline) for the horizontal line and fields that include a window count, and start and end addresses for that line. One descriptor exists for each window on a given line and for all lines that make up a screen. The IRM 316 is generated from the set of descriptors and placed into the DDR memory. Pointers to the IRM 316 are made available to the individual IRM filters. The fields are parsed for each line on the screen. The window count indicates how many structures are to be parsed for a given line. At the start of the line, the window count is shifted into a register and the start and end values are latched. As pixels are received, each pixel is checked to see if it resides within the start and end range. If it is within the range, the pixel data remains unchanged and flows to the VDMA component. However, if the pixel is not within the given range, the pixel RGB data is zeroed out but still allowed to pass through to a frame buffer. When the pixel address passes the end value, new start and end addresses are read, and the latched window count value is decremented. At the end of each line, new byte of IRM data is read from main memory and stored in the local buffer. This process is continued for all lines displayed on the screen. A typical display in accordance with some embodiments is shown in FIG. 5, in which monitor 380 shows three different security domains 382a, 382b, 382c. Note that data sent to the VDMA component contains packets consisting of several horizontal line unions. Each security domain has an array of IRM data sent to the MUX that is at least the number of vertical display lines multiplied by the number of bytes held in the horizontal line structure (4 bytes). In one embodiment, each security domain has a maximum of 16 windows per line, which means that four domains could show a maximum number of 64 windows (each containing different content) on a given line. The windows are associated with a plurality of different security domains up to a maximum number of security domains. Moreover, in some embodiments, these windows may be from displayed as the user desires—i.e., moved or adjusted onscreen by the use of I/O devices of the user at the MILS computer, rather than being presented in a predetermined format and location onscreen.

Turning back input selection in FIG. 3, HID arbitration component 342 associates user inputs from the keyboard and mouse with the appropriate security domain, i.e., the computer 350, 360, 370 intended to be interacted with by the user of the MILS computer 302. To accomplish this, the HID arbitration component 342 communicates with the interaction and management component 348 to ascertain, from the image routing map 316, both the security domain and content within that security domain with which the user intends to interact, and subsequently forwards the user inputs to the appropriate computer 350, 360, 370 within the security domain for interaction with the desired content.

As above, each security domain is associated with a different physical GPU 332a, 332b, 332c. Unlike environments in which GPUs are emulated, which carries its own set of problems, in one embodiment, each computer 350, 360, 370 is provided native control of its associated GPU 332a, 332b, 332c in MILS computer 302, a process that is called VGA passthrough. To provide control, when a security domain first becomes associated with the MILS computer 302, the hypervisor 320 and video controller 312 configure the MMU 334 to allocate a linear block of virtual addresses. These virtual addresses are assigned to the new security domain and become pseudo physical addresses for use by the MILS computer 302 in communicating with the computer 350, 360, 370. The translation between virtual and physical memory is transparent to the security domain, which operates as though the allocated virtual memory was real physical memory on a dedicated system. As shown, the MILS computer 302 is capable of simultaneously supporting multiple sets of address mappings for entirely different security domains through threads 314a, 314b, 314c.

When the GPU 332a, 332b, 332c is configured for VGA Passthrough, the memory resources of each GPU 332a, 332b, 332c is mapped into the virtual address space of the MILS computer 302 for the appropriate computer 350, 360, 370. To facilitate this, the video controller 348 and video isolation component 346 of the hypervisor 320 operate with the MMU 334 to update MMU 344 page table entries for the pseudo physical addresses of the appropriate computer 350, 360, 370. A set of the pseudo physical addresses assigned to appropriate computer 350, 360, 370 are remapped to the physical addresses device memory. Next an entry in a differentiated system description table listing the GPU 332a, 332b, 332c and associated memory mapping are added. When the video controller 352, 362, 372 of the computer 350, 360, 370 indicates to interaction and management component 348 of the video controller 312 of the MILS computer 312 the identification of the assigned GPU 332a, 332b, 332c (which will be used by the video driver 356, 366, 376 of computer 350, 360, 370 to communicate with GPU 332a, 332b, 332c), the interaction and management component 348 acquires the pseudo physical addresses.

As described above, in various embodiments, the interaction and management component 346 may be operated in one or more modes. These modes include single mode and/or mixed mode. In the single mode, a user of the MILS computer 302 is limited to interacting with one security domain at a time. This interaction may either manual interaction via the I/O device 390 or visual interaction via the monitor 380. In the single mode, the user manually switches between security domains by operating the I/O device 390 in a predetermined manner, such as by entering a control sequence on a keyboard, which is similar to the operational experience of using standard keyboard video mouse (KVM) switches. This is in contrast to mixed mode, in which a user is able to simultaneously interact with multiple security domains and content such as application windows from the security domains can be presented simultaneously on the monitor 380. In some circumstances, the MILS computer 302 may permit a user to switch between modes, and further allow the user to adjust (or automatically adjust) the display to indicate which mode the MILS computer 302 is in. For example, the particular mode being used may be displayed on monitor 380, as may the manner of switching between modes. In some embodiments, the background of the monitor 380 may change dependent on the mode to indicate the current mode, and in single mode the content from security domains that are not in focus may be blanked out or supplanted by content now in focus to entire remove from the monitor 380 content previously in focus.

In one embodiment, the MILS computer 302 uses video MUX 344 to establish the mixed mode. More specifically, in one embodiment video MUX 344 is contained in a field programmable gate array (FPGA), along with GPUs 332a, 332b, 332c, with multiplexing logic that parses each GPU video stream to display only desired content on the monitor 380. To accomplish this, the interaction and management component 346 uses the image routing map 316 to identify the specific pixels from a particular security domain are to be displayed on the monitor 380. The information sent to the monitor 380 also contains identifying information of the particular security domain. The monitor 380 is thus able to display entirely different content (programs, windows) running in different security domains and adjust visualization of the programs dependent on the originating security domain. For example, the displays presented from the different security domains may be outlined or shaded in different colors. If the same program is being operated in different security domains, in other examples different fonts, text sizes, or internal colors may be used. Similarly, a legend may be presented on the monitor 380, either separate from or overlaid on, each set of content indicating the security domain from with the content originated.

As indicated above, the interaction and management component 348 also maintains a list of application windows that are in use (i.e., open) in a desired order, such as by focus. This list is used to generate the image routing map 316. Each element in the list contains data including an identification of the window, the position on the monitor, window size and originating security domain. The interaction and management component 348 has a number of external interfaces that are used to provide functionality. In one embodiment, a first interface receives window attributes and events from each security domain via a virtual serial port (using a user space daemon in the controller 312), a second interface communicates the image routing map 312 to the FPGA via a physical RS232 serial link and a third interface determines user interaction with content from the security domains via a POSIX pipe, using the HID arbitration component 342 to set the active window as well as to switch modes. In particular, the first interface receives and forwards specific events including window map, window unmap and window in focus events. Note that many windows events may occur, most of which are unrelated to the specific events to be forwarded. The events that are filtered are events that indicate a particular window (i.e., computer or security domain) is currently in focus, out of focus, or updated (e.g., resized or moved). Thus, the controller 312 tracks and filters the events such that only those events that are of import to the computer 350, 360, 370 are provided to the computer 350, 360, 370.

The HID arbitration component 342 routes the filtered events from the I/O user devices 390 to the desired security domain. The routing decisions depend on the information received from the interaction and management component 348, including the current mode of operation (single or mixed) and windows focus via user space daemons in the controller 312. The focus depends on controls entered via keyboard in single mode or by mouse click (on the active window) in mixed mode. While a particular security domain is in focus, all inputs from the I/O devices 390 are routed by the HID arbitration component 342 to the I/O driver 354, 364, 374 to the particular computer 350, 360, 370 and are not observable by other computers 350, 360, 370 in other security domains.

To determine events triggered by the I/O devices 390, as each I/O device 390 is connected to the MILS computer 302, the particular I/O device 390 is assigned a device descriptor in the /dev/input/N file system of the MILS computer 302, which is later accessed to access to the particular I/O device 390. Different daemons executing within the controller 312 handle input and routing of I/O events in the MILS computer 302. For events, which are stored in a FIFO queue (/dev/event/), the appropriate space daemon (keyboard or mouse) of controller 312 queries the input event subsystem as to where the I/O device 390 is mapped. Once the location is identified, the particular I/O device file is opened and continually polled for input events. If an event from the particular I/O device 390 is received, a parsing unit in the HID arbitration component 342 determines whether the event is a control sequence that signals a change in mode or focus.

A keyboard event, for example, may contain a predetermined control sequence, such as <ALT> <ALT>, as a prefix to signal such a change, with the change being the following character. The control commands in this case may include, in one embodiment, different letters to change to different modes and numbers to change the focus between different security domains (with a corresponding change such as highlighting to the screen display on the monitor to indicate the current focus, or a number overlaying/discreetly near a particular security domain to identify the domain). Control commands are sent to the display space daemon in the controller 312 while non-control commands are sent through a POSIX pipe associated with the particular security domain that is currently under focus.

Similarly, routing for a mouse event depends on the current mode. In single mode, mouse events are simply routed to the domain having focus, while in the mixed mode routing depends on which domain has the highest level of focus. When a mouse event occurs, the current position of the mouse cursor on the display is determined and the domain associated with that position is resolved. Unlike in single mode in which the mouse events are sent only to the current domain, in some embodiments when in mixed mode, mouse events are forwarded to all security domains so that the mouse cursor is synchronized between all of the security domains. In other embodiments however, the mouse events may be forwarded to only a limited number of security domains as determined by the user, for example.

More specifically, keyboard events are captured by the user space daemon HIDKD and mouse events by the user space daemon HIDMD. Keyboard and mouse events are each provided to a separate MUX as well as to a component that determines whether the event changes the focus. The component indicates to the controller (for display purposes) as well as the associated MUX which window is in focus. The MUX then, based on the focus as indicated by the component, forwards the event to the appropriate security domain.

Turning to the video components, the video MUX 344 reintegrates the content of the separate video streams from the different security domains into a single display on the monitor 380. Application windows from each security domain are able to be arranged on the display of the monitor 380, in various embodiments either by the user or automatically by the computer 302 in a default layout. In different embodiments, the windows are able to be tiled, cascaded, and overlaid. The window layout is controlled by an image routing map, via which individual pixels from the different security domains are routed to the monitor 380. Application windows are able to be opened, closed, resized, moved, minimized, and layered, independent of whether they are from a single security domain or different security domains.

Figure 6:
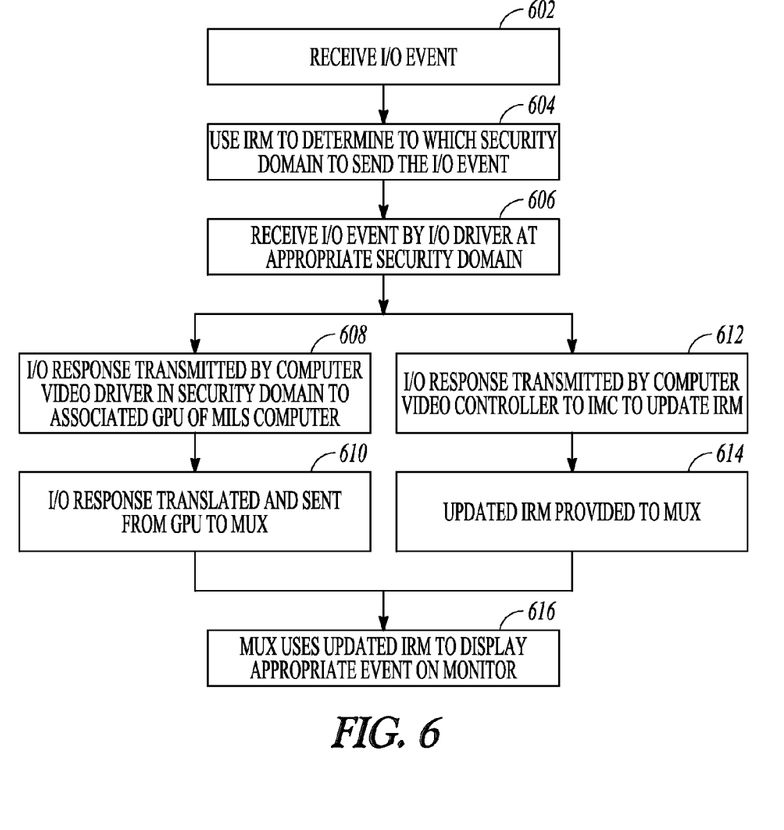
FIG. 6 illustrates a flowchart of a method in accordance with some embodiments.

FIG. 6 illustrates a flowchart of a method in accordance with some embodiments. In one embodiment, the manner in which the user of the MILS computer interacts with the computers in the different security domains, an I/O event of an I/O device associated with the MILS computer is received by the MILS computer in step 602. An HID arbitration component in the MILS computer uses an image routing map (IRM) that determines which security domain is the subject of the I/O event to determine to which security domain to send the I/O event in step 604. The I/O event is received by the I/O driver at the appropriate security domain in step 606. The response from the computer in the security domain is transmitted by the video driver of the computer to an associated GPU of the MILS computer in step 608. The response is then translated and sent from the GPU to a MUX in step 610. A response is also transmitted by a video controller in the computer to an interaction and management component to update the IRM in step 612, which is then provided to the MUX in step 614. The MUX uses the updated IRM to display the appropriate event on the monitor in step 616. The event, for example, may be a keyboard or mouse event that changes the current focus to a different security domain or that resizes or otherwise changes a window in the security domain of the current focus (or opens another window in the security domain of the current focus) in the same manner as a user using the computer would see. However, while content associated with the computer would only be displayed to the user in that security domain, in contrast, content from that security domain as well as at least one other security domain is displayed to the user of the MILS computer. Moreover, the content from that security domain is able to be displayed in a similar manner (e.g., the same location, same size) by the MILS computer as by the computer in the security domain.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of providing keyboard, video, and mouse (KVM) context-aware control, the method comprising:
   simultaneously displaying content from a plurality of second computers associated with different security domains on a monitor of a first computer, the content from the second computer in a particular security domain able to be displayed at the first computer in a similar manner as the content is displayed at the second computer in the particular security domain;
   forwarding an input/output (I/O) event to a desired one of the plurality of second computers dependent on a focus of the content to permit control of the content at the desired one of the plurality of second computers to which the I/O event was forwarded without switching between security domains; and
   selecting between a plurality of modes including a single mode that limits a user of the first computer to view and interact with only one security domain at a time and a mixed mode that allows users to interact with and view content from multiple security domains simultaneously.

2. The method of claim 1, wherein each security domain is associated with a separate graphics processing unit (GPU) such that covert channels using one of the GPUs are prevented from being formed between the security domains.

3. The method of claim 2, further comprising:
   identifying and arbitrating content to be presented to a user of the first computer;
   tracking active content and the security domains; and
   collecting pixel address information of pixels to be displayed on the monitor from the active content and generating an image routing map based on the collected pixel address information.

4. The method of claim 3, further comprising:
   updating the image routing map in response to the I/O event such that the appropriate content is interacted with in response to the I/O event using the image routing map and display of the content changes as a function of the updated image routing map.

5. The method of claim 4, further comprising:
   filtering the I/O event such that an I/O event that changes the focus or updates a window characteristic of the desired one of the second computers on the monitor of the first computer is not provided to the desired one of the second computers to which the I/O event was forwarded.

6. The method of claim 1, further comprising:
   integrating isolated video feeds from the plurality of security domains into a unified image for presentation on the monitor.

7. The method of claim 1 further comprising:
   mapping a physical graphics processing unit (GPU) to each security domain to create a 1-to-1 binding between a GPU and corresponding security domain; and
   maintaining a separation layer between the mappings to insure that neither a security domain nor the corresponding GPU can access resources contained in other mappings.

8. The method of claim 1, further comprising:
   providing control and resources management via a privileged security domain for a plurality of other security domains, wherein the providing control and resources management includes configuring a memory management unit (MMU) associated with the privileged security domain to allocate linear blocks of virtual addresses for each of the plurality of other security domains and assigning the virtual addresses for a particular other security domain to the particular other security domain to become pseudo physical addresses for the particular other security domain.

9. The method of claim 8, wherein the particular other security domain is unaware of the translation performed by the MMU and operates as though the allocated virtual memory was real physical memory on a dedicated system.

10. The method of claim 1, further comprising:
controlling interaction at the first computer with the content using an image routing map that describes display of the content on the monitor, the image routing map containing vertical lines that correspond to vertical lines of pixels on the monitor, each line containing line descriptors for a horizontal line and fields that include a window count that indicates how many structures are to be parsed for the line, and start and end addresses for the line; and
displaying the pixels using the line descriptors such that for all lines displayed on the monitor the pixel data remains unchanged for each pixel that resides within the start and end range and pixel color data is zeroed out for each pixel that does not reside within the start and end range.

11. A system, the system comprising:
a first computer configured to communicate with a plurality of second computers associated with different security domains, the first computer comprising a controller configured to provide keyboard, video, and mouse (KVM) context-aware control;
a monitor associated with the first computer, the monitor configured to simultaneously display content from the second computers, the content from the second computer in a particular security domain able to be displayed at the first computer in a similar manner as the content is displayed at the second computer in the particular security domain; and
an input/output (I/O) device configured to receive an I/O event and provide the I/O event to the controller, the controller configured to forward the I/O event to a desired one of the plurality of second computers dependent on a focus of the content and control the content at the desired one of the plurality of second computers to which the I/O event was forwarded without switching between security domains, the controller further configured to select between a plurality of modes including a single mode that limits a user of the first computer to view and interact with only one security domain at a time and a mixed mode that allows users to interact with and view content from multiple security domains simultaneously.

12. The system of claim 11, further comprising:
a plurality of graphics processing units (GPUs) each of which is associated with a different security domain and configured to receive visual content from a different one of the second computers such that covert channels are prevented from being formed between the security domains using the GPUs.

13. The system of claim 12, wherein the first computer comprises:
a processor configured to at least one of:
associate user inputs from the I/O device with the appropriate security domain,
integrate video streams from the GPUs into a unified display for presentation on the monitor, or
establish one-to-one mappings between each security domain and an associated GPU and enforce isolation between the mappings.

14. The system of claim 12, wherein the first computer comprises:
a processor configured to identify and arbitrate content to be displayed on the monitor, track content and security domains associated with the content to allow real-time monitoring of which content is active and being utilized, collect pixel address information of pixels to be displayed on the monitor from the active content and generate an image routing map to map what content is being displayed on the monitor, where the content is being displayed and from which security domain the content originates.

15. The system of claim 14, wherein the processor is further configured to update the image routing map in response to the I/O event such that the appropriate content is interacted with in response to the I/O event using the image routing map and display of the content changes as a function of the updated image routing map.

16. The system of claim 15, wherein the processor is further configured to filter the I/O event such that an I/O event that changes the focus or updates a window characteristic of the desired one of the plurality of second computers to which the I/O event was forwarded on the monitor is not provided to the desired one of the plurality of second computers to which the I/O event was forwarded.

17. The system of claim 14, wherein:
the processor is further configured to control interaction of the first computer with the content using the image routing map, the image routing map contains vertical lines that correspond to vertical lines of the pixels, each line contains line descriptors for a horizontal line and fields that include a window count that indicates how many structures are to be parsed for the line, and start and end addresses for the line, the monitor configured to display the pixels using the line descriptors such that for all lines displayed on the monitor the pixel data remains unchanged for each pixel that resides within the start and end range and pixel color data is zeroed out for each pixel that does not reside within the start and end range.

18. A non-transitory computer-readable storage medium that stores instructions for execution by one or more processors of a device to configure the device to provide keyboard, video, and mouse (KVM) context-aware control, the one or more processors to configure the device to:
provide display of simultaneous content from a plurality of computers associated with different security domains on a monitor of the device, the content from the computer in a particular security domain able to be displayed at the device in a similar manner as the content is displayed at the computer in the particular security domain;
forward an input/output (I/O) event to a desired one of the plurality of computers dependent on a focus of the content to permit control of the content at the desired one of the plurality of computers to which the I/O event was forwarded without switching between security domains; and
select between a plurality of modes including a single mode that limits a user of the first computer to view and interact with only one security domain at a time and a mixed mode that allows users to interact with and view content from multiple security domains simultaneously.

19. The non-transitory computer-readable storage medium of claim 18, the one or more processors to further configure the device to:
identify and arbitrate content to be displayed on the monitor, track content and security domains associated with the content to allow real-time monitoring of which content is active and being utilized, collect pixel address information of pixels to be displayed on the monitor from the active content and generate an image routing map to map what content is being displayed on the monitor, where the content is being displayed and from which security domain the content originates, and update the image routing map in response to the I/O event such that the appropriate content is interacted with in response to the I/O event using the image routing map and display of the content changes as a function of the updated image routing map.

* * * * *

UNITED STATES PATENT AND TRADEMARK OFFICE
CERTIFICATE OF CORRECTION

PATENT NO. : 9,715,599 B2
APPLICATION NO. : 14/609633
DATED : July 25, 2017
INVENTOR(S) : Dale W. Reese Page 1 of 1

It is certified that error appears in the above-identified patent and that said Letters Patent is hereby corrected as shown below:

In the Drawings

Sheet 2 of 5, Fig. 2, reference numeral 250, Line 1, delete "250" and insert --240-- therefor In the Specification In Column 5, Line 44, delete "334," and insert --344,-- therefor In Column 8, Line 27, delete "348" and insert --312-- therefor In Column 8, Line 29, delete "344" and insert --334-- therefor In Column 8, Line 39, delete "312" and insert --302-- therefor In Column 8, Line 45, delete "346" and insert --348-- therefor In Column 9, Line 12, delete "346" and insert --348-- therefor In Column 9, Line 41, delete "312" and insert --316-- therefor Signed and Sealed this
Twenty-eighth Day of May, 2019

Andrei Iancu
*Director of the United States Patent and Trademark Office*